Oct. 31, 1961   R. M. GOODWIN ET AL   3,006,058
HEADLAMP LEAD WIRE MOUNTING APPARATUS
Filed April 8, 1957   5 Sheets-Sheet 2

INVENTORS
Richard M. Goodwin,
Richard L. Imler, &
BY William E. Thompson

E. W. Christen
ATTORNEY

Oct. 31, 1961  R. M. GOODWIN ET AL  3,006,058
HEADLAMP LEAD WIRE MOUNTING APPARATUS
Filed April 8, 1957  5 Sheets-Sheet 3
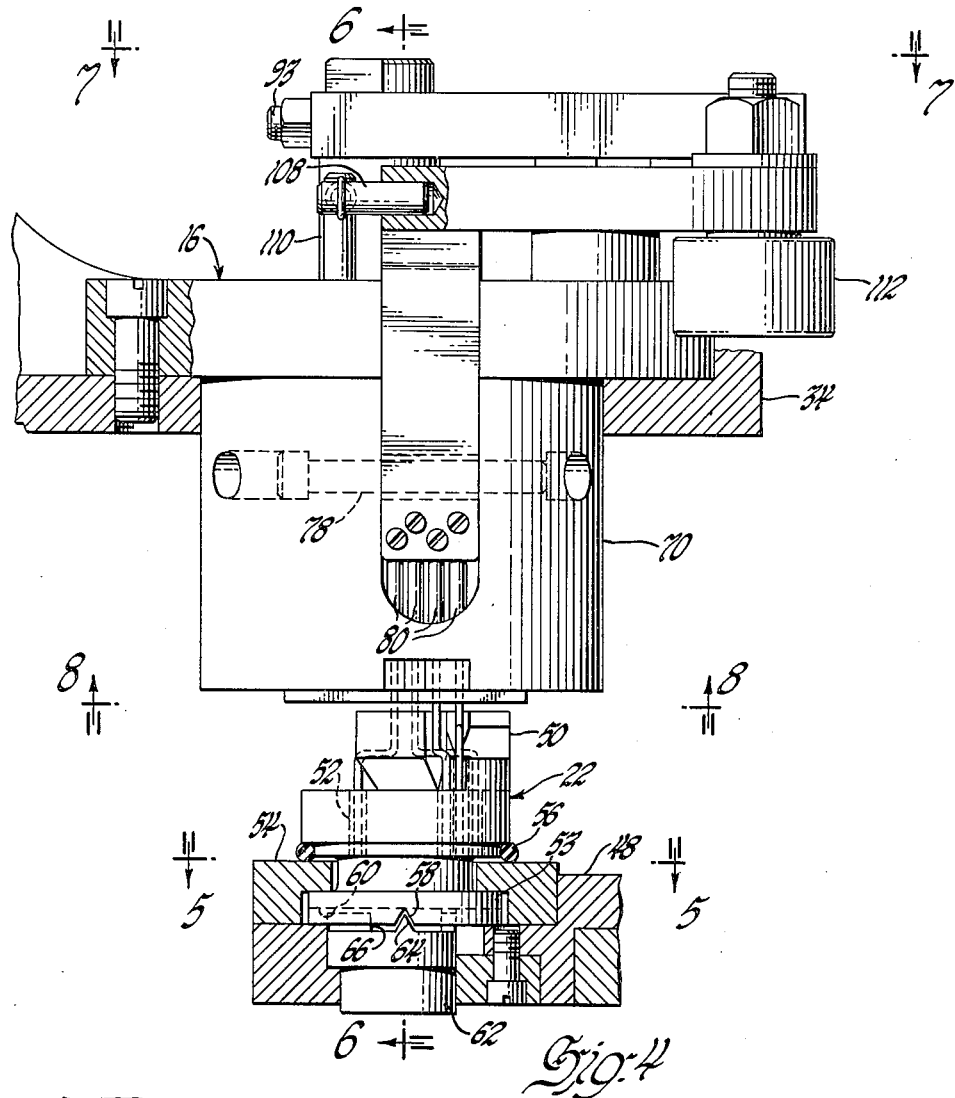
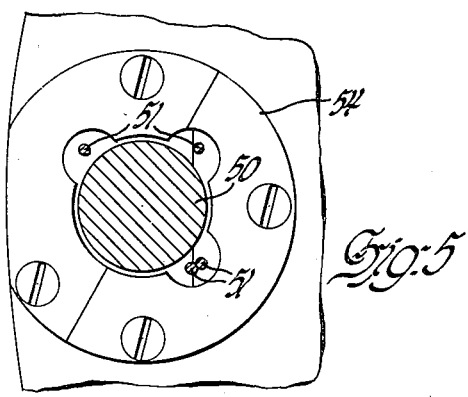
INVENTORS
Richard M. Goodwin,
Richard L. Imler, &
BY William E. Thompson
E. W. Christen
ATTORNEY

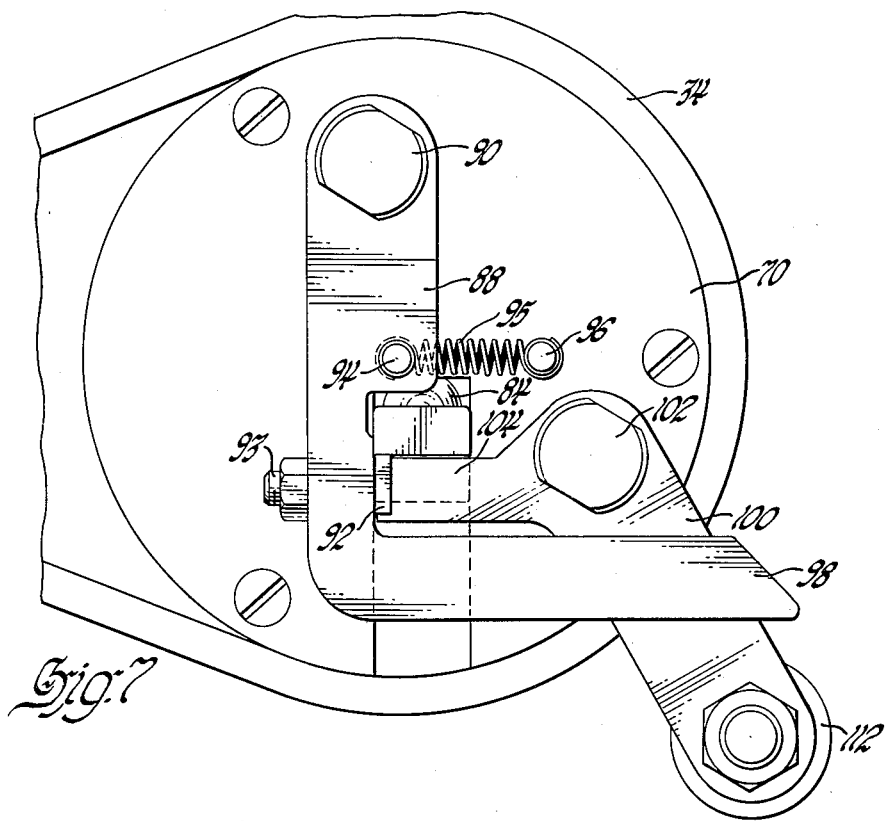
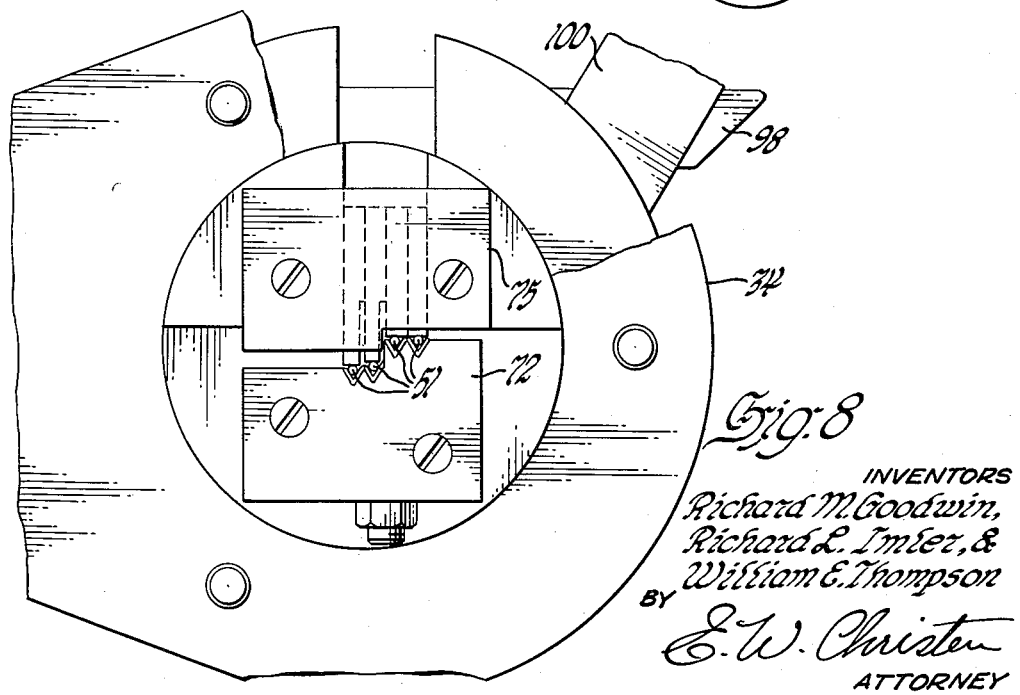

United States Patent Office 3,006,058
Patented Oct. 31, 1961

3,006,058
HEADLAMP LEAD WIRE MOUNTING APPARATUS
Richard M. Goodwin, Richard L. Imler, and William E. Thompson, Anderson, Ind., assignors to General Motors Corporation, Detroit, Mich., a corporation of Delaware
Filed Apr. 8, 1957, Ser. No. 651,390
3 Claims. (Cl. 29—25.2)

This invention relates to the manufacture of headlamps and more particularly to apparatus for forming and positioning the filament mounting structure in the headlamp reflector.

In the fabrication of the all-glass sealed beam headlamp, the filament mounting structure comprises a group of metal ferrules embedded in the glass reflector with lead wires affixed to the ferrules for supporting the lamp filaments. The filament location is, of course, critical to the lamp performance and accordingly the lead wires must be precisely positioned in preparation for the mounting of the filaments thereon. Heretofore, it has been a common practice to form the lead wires after affixing them to the metal ferrules and difficulty has been encountered in that the lead wires exhibit a tendency to spring back after the forming operation. In accordance with this invention, this difficulty in lead wire positioning is obviated by forming the lead wires prior to affixing them to the metal ferrules. This is preferably accomplished by forming the lead wires as a group and transferring the group to the ferrules on the reflector and securing them thereto while the upper ends are held in a predetermined position.

The lead wire forming and positioning operation must be coordinated with the so-called brazing operation in which the lead wires are affixed to the ferrules. For this purpose and in accordance with this invention, an auxiliary turret is provided with plural lead wire support heads upon which the leads are formed and which move in a rotative path intersecting the rotative path of the reflector support heads on the main or brazing turret at a transfer station. Disposed over each of the plural reflector support heads on the main turret is a transfer mechanism which is adapted to be lowered and raised at the transfer station for lifting the preformed lead wires as a group. In order to facilitate removal of the lead wire group from the lead wire support head, the support head is provided with a floating support on the auxiliary turret to prevent binding of the wires upon their removal. At a succeeding station on the main turret, the transfer mechanism is lowered to position the lead wires as a group into the respective metal ferrules. While the brazing material in the ferrules is in a heated condition, the transfer mechanism is momentarily actuated to release the lead wires and permit them to settle in the ferrules. Prior to the hardening of the brazed joint, the transfer mechanism re-engages the lead wires and holds them in their predetermined final position. In a subsequent station, the transfer mechanism is actuated to effect a final release of the lead wires and the positioning operation is completed.

A more complete understanding of this invention may be had from the detailed description which follows taken with the accompanying drawings in which:

FIGURE 4 is a side view of the transfer mechanism and lead wire support head;

FIGURE 5 shows a detail of construction of the lead wire support head and is taken on lines 5—5 of FIGURE 4;

FIGURE 7 is a top view of the transfer mechanism taken on lines 7—7 of FIGURE 4; and FIGURE 8 is a bottom view of the transfer mechanism taken on lines 8—8 of FIGURE 4.

Figure 1:
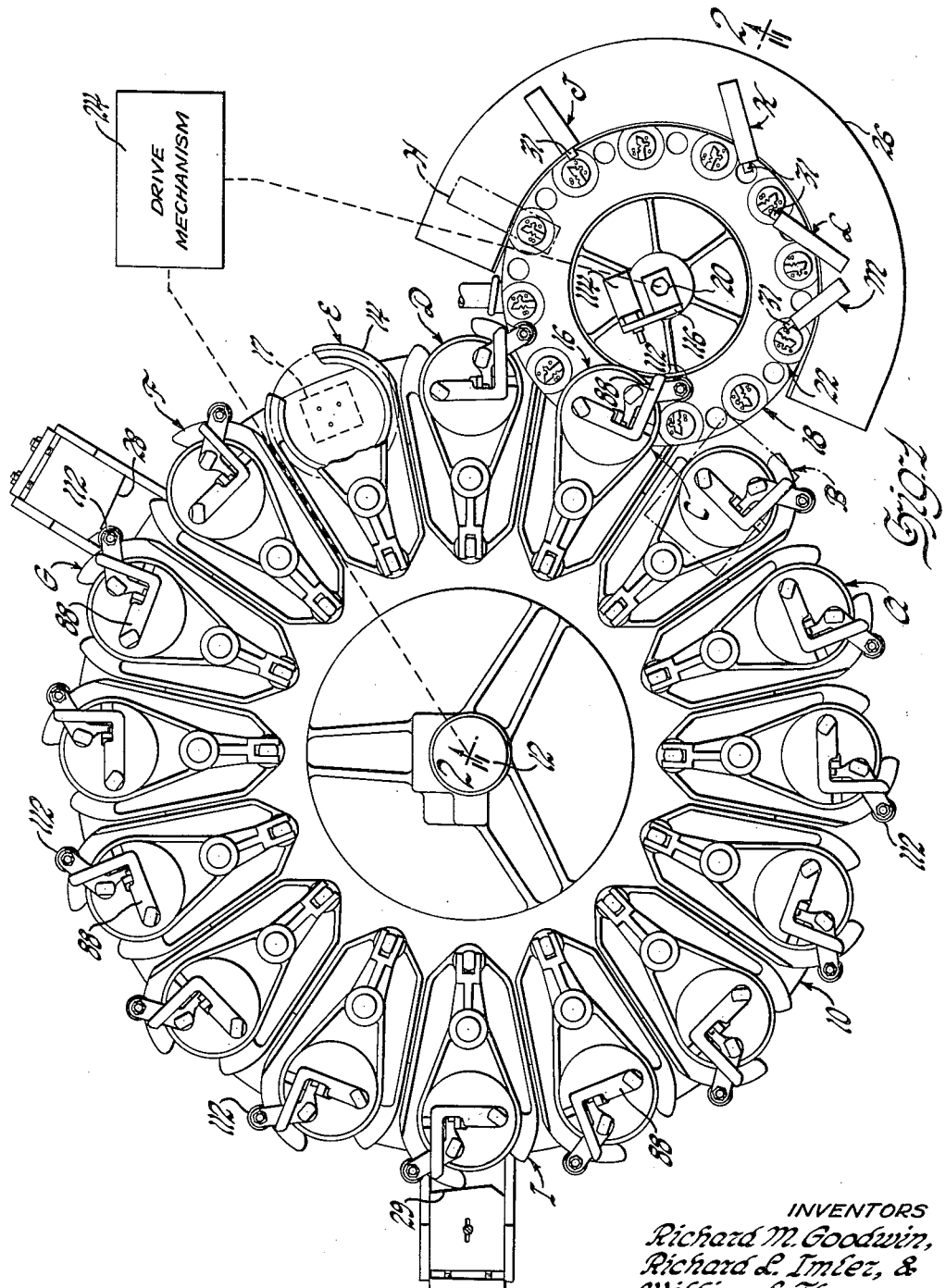
FIGURE 1 is a plan view of the inventive apparatus.

Referring now to the drawings, there is shown an illustrative embodiment of the invention in apparatus for forming and positioning lead wires in the reflectors of all-glass sealed beam headlamps. As shown in FIGURE 1, the apparatus comprises a main conveyor or brazing turret 10 which is rotatably mounted upon a central vertical shaft 12 and which supports adjacent its periphery a plurality of reflector support heads 14. Disposed over each of the support heads 14 is a transfer mechanism 16 adapted to transport a group of lead wires. Adjacent the main turret 10 is an auxiliary lead forming turret 18 which is rotatably mounted upon a central vertical shaft 20. The lead forming turret 18 is provided with a plurality of lead wire support heads 22 disposed adjacent its periphery. The main turret 10 and the lead forming turret 18 are so arranged that the rotative path of the lead wire support heads 22 intersects the rotative path of the reflector support heads 14 at a transfer station C. The turrets 10 and 18 are driven in synchronism by a drive mechanism 24 which is adapted to advance the turrets intermittently to index the support heads thereon successively into the transfer station C with the corresponding reflector support head 14 and the lead wire support head 22 being indexed simultaneously into the transfer station. The main turret 10 is provided with other operating stations including a reflector loading station A at which an operator places a reflector in each head as it is indexed in the station. A brazing material feeding station B is provided for the automatic deposit of brazing powder, or the like, in the metal ferrules on the reflector. Subsequent to the station B, in the rotative direction of the main turret 10, at each of plural selected stations is a burner 17 for heating the brazing powder in the metal ferrules. The burners are suitably located at stations C through G or in such number as desired. Intermediate stations F and G there is disposed a cam block 28 for coaction with the transfer mechanism 16 and at station I there is provided a cam block 29 for coaction with the transfer mechanism 16 in a manner to be described subsequently.

Disposed adjacent the auxiliary turret 18 is a fixed support table 26 upon which are arranged plural operating stations. A wire feed station H is provided, first in order, to position a plurality of lead wires upon each lead wire support head 22 as it is indexed into station H. Subsequent to the station H, in the rotative direction of the auxiliary turret 18, are provided a plurality of lead bending stations J, K, L, and M each of which is provided with a movable die 31.

Figure 2:
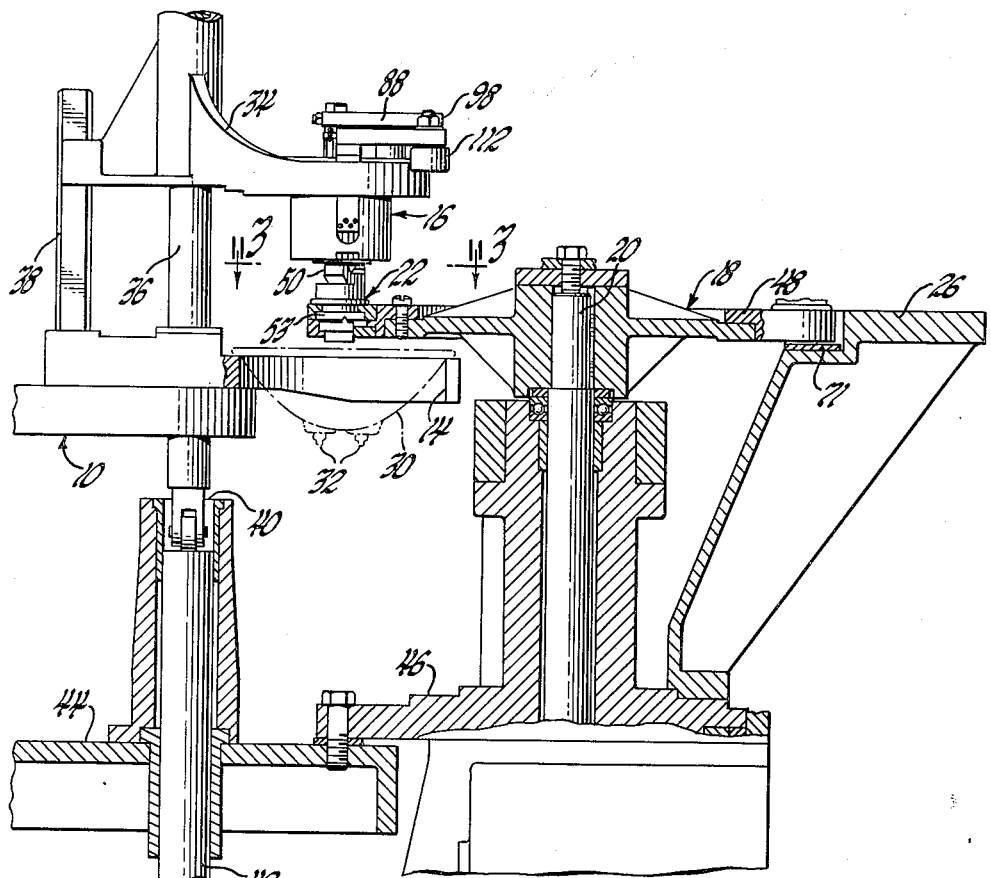
FIGURE 2 is a side view, partially in section, taken on lines 2—2 of FIGURE 1.
Figure 3:
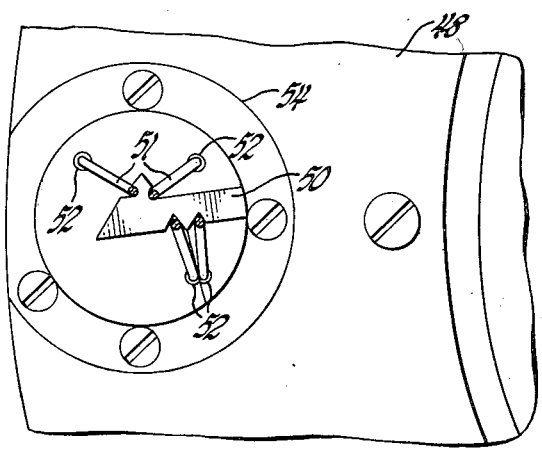
FIGURE 3 is a view of the lead wire support head taken on lines 3—3 of FIGURE 2.

As shown in FIGURE 2, the reflector support heads 14 support a reflector 30 with a plurality of metal ferrules 32 affixed to its base portion and having its axis disposed in a vertical direction. Suitably, the reflector is provided with three metal ferrules, only two of which may be seen in the drawings. The transfer mechanism 16 is mounted in a bracket 34 above the support head 14. The bracket 34 is mounted upon a vertical follower rod 36 for reciprocation therewith and is guidably supported by a guide member 38. The follower rod 36 is adapted to ride upon a cam track 40 which extends circumferentially of the turret 10 and is supported upon a fixed support table 44. At the transfer station C the cam track 40 includes a vertically reciprocable piston 42 which is actuated by the intermittent drive mechanism 24 to alternately lower and raise the follower rod 36 when a reflector support head 14 is indexed into the transfer station C.

Figure 6:
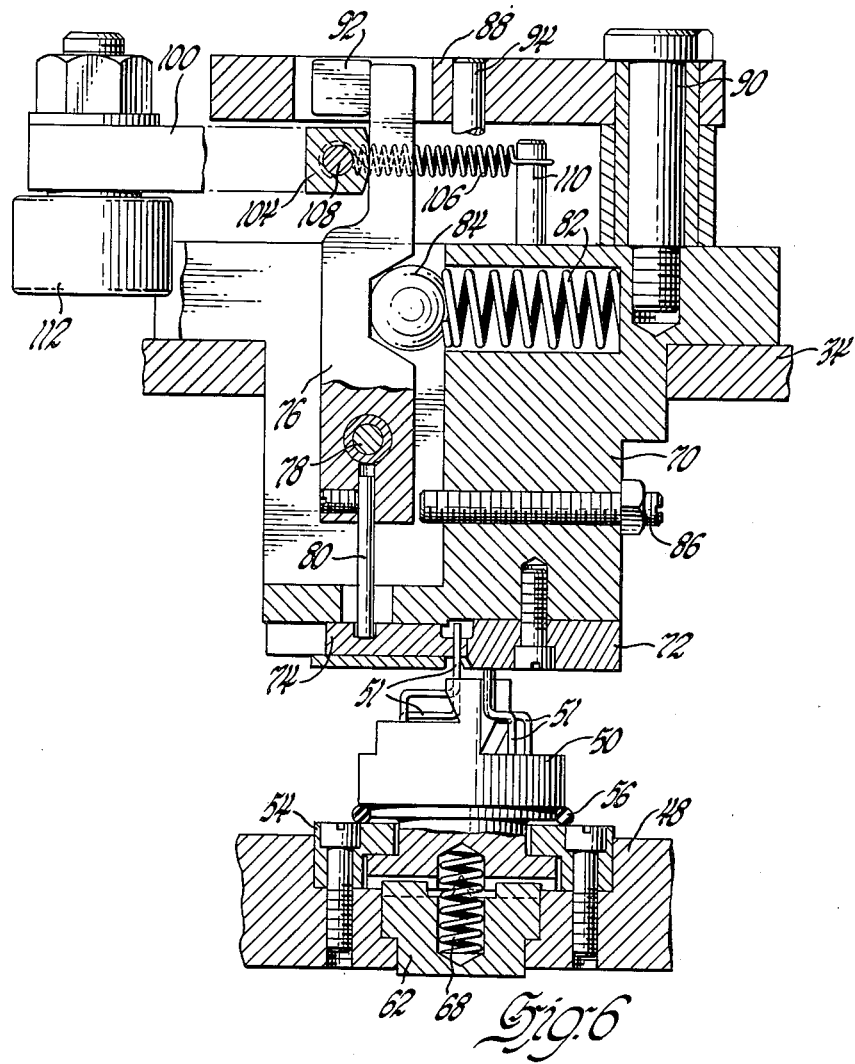
FIGURE 6 is a sectional view, through the transfer mechanism and lead wire support head, taken on lines 6—6 of FIGURE 4.

The auxiliary turret 18, as shown in FIGURE 2, is secured at its base portion by a lateral flange 46 to the fixed support table 44 of the main turret 10. The turret 18 includes an annular support plate 48, suitably of two part construction as shown in FIGURE 4, for mounting of the lead wire support heads 22. The support heads 22 include a fixed die 50 which is adapted to receive the lead wires 51 in spaced recesses 52. The lower ends of the wires are held in the recesses during the wire forming operation in which the die 50 coacts with the movable dies 31 at the bending stations J, K, L, and M. As shown in FIGURE 4, the die 50 is provided at its base portion with an annular flange 53 which is seated upon the support plate 48. A retaining member 54, preferably of two-part construction as shown in FIGURE 5, has an inwardly extending annular flange seated lightly upon the flange 53 and is secured by screw-threaded fasteners to the support plate 48. The retaining member 54 is radially spaced from or oversized relative to the base of the die 50 to permit limited lateral displacement of the die for a purpose which will hereinafter be explained. An annular washer 56 of resilient material is disposed between the retaining member 54 and the base of the die 50. The lowermost surface of the die 50 is provided with a pair of V-shaped grooves 58 and 60 extending transversely of the die 50 and normally to each other. Disposed below the die 50 in the support plate 48 is a locking plunger 62. The plunger 62 is provided on its upper surface with a pair of transversely extending V-shaped ribs 64 and 66 which are aligned with the grooves 58 and 60, respectively. A coil spring 68 (FIGURE 6) is positioned between the die 50 and the plunger 62 to urge the plunger 62 downwardly. The plunger 62 at its lower end projects somewhat beyond the support plate 48 and is supported upon a cam rail 71 (FIGURE 2) extending circumferentially of the turret 18. The cam rail 71 is of such configuration that the locking plunger 62 of each support head 22 is urged upwardly into engagement with the die 50 when the head is indexed into each of the bending stations J, K, L, and M and suitably throughout the travel from the wire feeding station H through the final bending station M. The action of the locking plunger 62 is effective by the mating engagement of the V-shaped ribs 64 and 66 with the grooves 58 and 60 to accurately position the die 50 and hold it in fixed position during the wire feeding and bending operations. However, at the transfer station C the cam rail 71 terminates or recedes from the locking plunger 62 permitting it to be retracted by the spring 68 from the die 50. Thus, the die 50 is permitted limited lateral motion to facilitate the removal of the lead wires 51 therefrom without any binding engagement with the die 50.

The transfer mechanism 16, as shown in FIGURES 4, 6, 7, and 8, comprises a body member 70 provided with an annular flange which is seated upon the support bracket 34 and secured thereto in a suitable manner. At the lower portion of the body member 70 there is disposed a fixed jaw 72 and a plurality of slidable jaws 74 for coaction therewith. The slidable jaws 74 are retained on the body member 70 by a support plate 75. It is noted that the jaws 72 and 74 are provided with a configuration adapted to grip the upper ends of the lead wires 51 which are disposed in a predetermined pattern after the forming operations. An operating lever 76 for the movable jaws 74 is pivotally mounted upon the body member 70 by a transversely extending pivot pin 78. The jaws 74 and the operating lever 76 are interconnected by plural spring wires 80 extending longitudinally of the lever at one end thereof. Adjacent the other end of the operating lever 76 a coil spring 82 and a ball 84 are interposed between the body member 70 and the operating lever 76 to rotatively urge the latter in a direction tending to close the jaws 74 and 72. A stop screw 86 extending through the body member 70 serves to limit the rotation of the operating lever 76 in the jaw closing direction. A latch lever 88 of bell crank configuration is disposed on the upper portion of the body member 70 and pivotally mounted thereon at one end by a pivot pin 90. The lever 88 is pivotal in a plane perpendicular to that of the operating lever 76 and is provided on one arm with a latching element or shoulder 92 which is engageable with the upper end of the operating lever to retain the latter in the jaw open position. The latching element 92 suitably takes the form of the head structure of a bolt 93. The latch lever 88 is resiliently urged in the latching direction by a coil spring 95 extending between the pin 94 on lever 88 and the pin 96 on the body member 70. The other arm of the latch lever 88 terminates in an inclined surface 98 for coaction with an actuator to be described subsequently. A release lever 100 of bell crank configuration is disposed at the upper portion of the body member 70 and pivotally mounted thereon by a pivot pin 102 for pivotal motion in a plane parallel to that of the latch lever 88. One arm 104 of lever 100 is resiliently urged into engagement with the operating lever 76 in the jaw release direction by a coil spring 106 extending between the support pin 108 on arm 104 and the support pin 110 in the body member 70. The other arm of the release lever 100 supports a roller 112 for coaction with actuating means to be described presently.

To provide for actuation of the transfer mechanism 16, the latch lever 88 is aligned with a pneumatic actuator 114 which is mounted upon a support bracket 116 on the auxiliary turret 18 as seen in FIGURE 1. The actuator 114 has an operating piston which, in the extended position, engages the inclined surface 98 of the operating lever 88 as the transfer mechanism is indexed into the transfer station C. At station D, immediately following the transfer station C, the cam track 40 is adapted to lower the transfer mechanism 16 for the placement of the lower ends of the lead wires in the metal ferrules of the reflector 30. This movement may be accomplished by a piston at station D similar to the piston 42 shown in FIGURE 2 at the transfer station C. The release lever 100 is actuated to cause the jaws 72 and 74 to momentarily release the lead wires between stations F and G by the cam plate 28 which is disposed in alignment with the roller 112 of the release lever. It is noted that the release of the lead wires is momentary during the rotation of the main turret 10 by virtue of the limited extent and position of the cam plate 28. Complete and final release of the lead wires by the jaws 72 and 74 is effected at station I by the engagement of the cam plate 29 with the roller 112 of the release lever 100 and the elevating movement of the transfer mechanism 16 during the interval in which the transfer mechanism is indexed in station I. The elevation of the transfer mechanism at station G is effected by a piston in cam track 40 at station I similar to the piston 42 shown in FIGURE 2.

In operation, with the main turret 10 and the auxiliary turret 18 driven in synchronism by the intermittent drive mechanism 24, the reflector 30 is positioned in the support head 14 at the loading station A. When the reflector support head is indexed into station B a quantity of brazing material is deposited in each of the ferrules. This brazing material is heated at the succeeding stations, for example stations C through G. When the support head 14 is indexed into the transfer station C, a corresponding lead wire support head 22 is indexed therein by the auxiliary turret 18. In the preceding indexing movement of the support head 22, the lead wires 51 are positioned therein at the lead wire feeding station H and the lead wires are formed in the bending stations J, K, L, and M. Upon the simultaneous indexing of the reflector support head 14 and the lead wire support head 22 into the transfer station C, the transfer mechanism 16 with the jaws 72 and 74 in the open position is lowered by the actuation of the piston 42. With the transfer mechanism in the lowered position the upper ends of the lead wires 51 project between the jaws 72 and 74 and the actuator 114 is energized causing its piston to displace the latch lever 88 about its pivot pin 90. This displaces the latch element 92 from alignment with the operating lever 76 which is caused to pivot in the jaw closing direction under the influence of the coil spring 82. Thus, the jaws 72 and 74 grippingly engage the lead wires and the transfer mechanism is elevated by actuation of the piston 42. With the lead wire support head 22 in the transfer station C, the locking plunger 62 is permitted to retract from the die 50 by operation of spring 68 and the termination of the cam track 71. Thus, the die 50 is capable of limited lateral movement to prevent binding of the lead wires upon removal therefrom by the elevation of the transfer mechanism 16. As the reflector support head 14 is indexed into station D, the transfer mechanism 16 is lowered by the action of the cam track 40 for the placement of the lower ends of the lead wires 51 in the metal ferrules 32. During subsequent indexing movement of the support head 14, the transfer mechanism 16 remains in its lowered position to hold the lead wires in position. Following station F, the roller 112 of the release lever 100 engages the cam plate 28 and is rotated into engagement with the operating lever 76 to displace the latter in the jaw opening direction. Thus, the lead wires 51 are released and permitted to settle in the metal ferrules. It is noted that the displacement of the operating lever 76 is restricted by appropriate positioning of the cam plate 28 so that the operating lever is not aligned with the lateral edge of the latching element 92 and consequently the operating lever 76 is not re-latched in the jaw open position. As the roller 112 passes beyond the end of cam plate 28 the release lever 100 is returned to its initial position permitting the operating lever 76 to return to its jaw closing position under the influence of the coil spring 82. Thus the jaws 72 and 74 grippingly engage the lead wires 51 and hold them in position throughout the remaining cycle of the brazing operation during which the ferrules are cooled. At station G the cam plate 29 engages the roller 112 and rotates the release lever 100 to its full release position. In the full release position, the lever 100 displaces the operating lever 76 sufficiently to permit the latch element 92 on the latch lever 88 to laterally engage the operating lever and hold it in the latched position. Thus, the jaws 72 and 74 are held open and the transfer mechanism is elevated by the cam track 40. At a subsequent station, the reflector with the lead wires affixed is removed from the support head 14 and the support head and transfer mechanism 16 are in readiness for a succeeding cycle.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

We claim:
1. Apparatus for automatically forming lead wires and positioning the latter in a reflector comprising a main rotatable turret having a plurality of reflector support heads disposed adjacent its periphery, a lead wire transfer mechanism disposed over each of said reflector support heads, an auxiliary rotatable turret having plural lead wire support heads disposed adjacent its periphery, said lead wire support heads each including a support die disposed on said auxiliary turret and adapted to receive plural lead wires to be formed, movable dies disposed adjacent said turret for coaction with the support die to form the lead wires, means for locking said support die to said auxiliary turret during coaction of the support and movable dies, said turrets being arranged so that the lead wire support heads are disposed immediately below the transfer mechanisms with the rotative path thereof intersecting the path of the reflector support heads to define a transfer station, drive means connected with said turrets for intermittently indexing successive support heads on both turrets into said transfer station in synchronism, means at said station for alternately lowering and raising the transfer mechanisms for lifting lead wires in predetermined spaced relation from the lead wire support heads, means for releasing said support die from said auxiliary turret for limited relative motion thereon during operation of said transfer mechanism, and means at a subsequent station on the main turret for lowering said transfer mechanisms toward the respective reflector support heads for placement of the lead wires in the reflectors.

2. Apparatus for automatically positioning a plurality of lead wires in a reflector comprising a reflector support head, a lead wire support head adjacent said reflector support head, a lead wire support mounted on said lead wire support head for limited relative movement thereon and adapted to receive a plurality of spaced lead wires, and a lead wire transfer mechanism adapted to grippingly engage said lead wires in predetermined spaced relation for removal from said lead wire support and transfer to a reflector in said reflector support head, said lead wire support being movable relative to said lead wire support head during transfer of said lead wires to prevent binding of the latter with said lead wire support.

3. Apparatus for automatically forming lead wires and positioning the latter in a reflector comprising a reflector support head, a conveyor member adjacent said reflector support head, a support die mounted on said conveyor for limited relative movement thereon and adapted to receive a plurality of lead wires to be formed, movable dies for coaction with said support die to form the lead wires, a lead wire transfer mechanism adapted to grippingly engage the formed lead wires in predetermined spaced relation for removal from said support die and transfer to a reflector in said reflector support head, and means for locking said support die to said conveyor during coaction of said support die and said movable dies, and for releasing said support die from said conveyor for limited relative movement thereon during operation of the transfer mechanism.

References Cited in the file of this patent

UNITED STATES PATENTS

| | | |
|---|---|---|
| 2,372,082 | Iden | Mar. 20, 1945 |
| 2,387,074 | Hroch | Oct. 16, 1945 |
| 2,720,855 | Brent et al. | Oct. 18, 1955 |
| 2,748,738 | McGowan et al. | June 5, 1956 |
| 2,764,799 | McGowan et al. | Oct. 2, 1956 |
| 2,824,356 | Geisshuhler | Feb. 25, 1958 |

FOREIGN PATENTS

| | | |
|---|---|---|
| 762,996 | Great Britain | Dec. 5, 1956 |